US010486528B2

(12) United States Patent
Visarius et al.

(10) Patent No.: US 10,486,528 B2
(45) Date of Patent: Nov. 26, 2019

(54) VEHICLE COMPONENT AND MOTOR VEHICLE

(71) Applicants: Dr. Ing. h.c. F. Porsche Aktiengesellschaft, Stuttgart (DE); Magna Steyr Fuel Systems GesmbH, Sinabelkirchen (AT)

(72) Inventors: Ronald Visarius, Troisdorf (DE); Armin Krezer, Obersulm (DE); Dirk Braunwarth, Ostfildern (DE); Kai Podewski, Pforzheim (DE); Andreas Menke, Vaihingen an der Enz/Enzweihingen (DE); Josef Oesterle, Muehlacker (DE); Bernhard Gschanes, Gleisdorf (AT); Michael Schinnerl, St. Radegund (AT)

(73) Assignee: MAGNA STEYR FUEL SYSTEMS GESMBH, Sinabelkirchen (AT)

( * ) Notice: Subject to any disclaimer, the term of this patent is extended or adjusted under 35 U.S.C. 154(b) by 154 days.

(21) Appl. No.: 15/210,906

(22) Filed: Jul. 15, 2016

(65) Prior Publication Data
US 2017/0021723 A1    Jan. 26, 2017

(30) Foreign Application Priority Data
Jul. 22, 2015 (DE) .................. 10 2015 111 895

(51) Int. Cl.
*F16L 37/088* (2006.01)
*B60K 15/04* (2006.01)
(Continued)

(52) U.S. Cl.
CPC .............. *B60K 15/04* (2013.01); *B60K 15/01* (2013.01); *F16L 37/088* (2013.01);
(Continued)

(58) Field of Classification Search
CPC .... F16L 37/088; F16L 37/084; F16L 2201/10
(Continued)

(56) References Cited

U.S. PATENT DOCUMENTS 738,503 A * 9/1903 Waters ................. F16L 37/088
                                                131/225
794,110 A * 7/1905 McDowell ......... F16L 27/0828
                                                277/616
(Continued)

FOREIGN PATENT DOCUMENTS

DE        4310192 C2    2/1994
DE        10100128 A1   8/2001
(Continued)

*Primary Examiner* — Aaron M Dunwoody
(74) *Attorney, Agent, or Firm* — Leydig, Voit & Mayer, Ltd.

(57) ABSTRACT

A vehicle component for a motor vehicle includes a coupling device including two couplable coupling elements configured to provide, in a coupled state, a fuel-tight connection of two fuel-conducting lines. One of the coupling elements is in a form of a metallic female element which is fixedly connectable to one of the two lines, and an other one of the coupling elements is in a form of a metallic male element which is fixedly connectable to an other one of the two lines. The male element, for coupling purposes, is insertable into the female element, wherein, in the coupled state, an axially extending overlap section with at least one radial seal device is formed between the female element and the male element. A securing device is configured to secure the coupling elements in the coupled state against inadvertent release from one another.

20 Claims, 3 Drawing Sheets

(51) Int. Cl.
*B60K 15/01* (2006.01)
*B60K 15/03* (2006.01)

(52) U.S. Cl.
CPC .............. *B60K 2015/03467* (2013.01); *B60K 2015/047* (2013.01); *B60K 2015/0474* (2013.01); *F16L 2201/10* (2013.01)

(58) Field of Classification Search
USPC .............................................. 285/321, 347
See application file for complete search history.

(56) References Cited

U.S. PATENT DOCUMENTS

| | | | | |
|---|---|---|---|---|
| 3,314,696 A * | 4/1967 | Ferguson | .............. | F16L 37/088 24/665 |
| 3,584,902 A * | 6/1971 | Vyse | .............. | F16L 37/088 285/305 |
| 3,625,551 A * | 12/1971 | Branton | .............. | F16L 37/088 285/305 |
| 3,753,582 A * | 8/1973 | Graham | .............. | F16L 37/088 24/573.11 |
| 3,922,011 A * | 11/1975 | Walters | .............. | F16L 37/088 285/277 |
| 3,948,548 A * | 4/1976 | Voss | .............. | F16L 37/088 285/148.27 |
| 4,278,276 A * | 7/1981 | Ekman | .............. | F16L 37/088 285/321 |
| 4,294,473 A * | 10/1981 | Ekman | .............. | F16L 19/00 285/321 |
| 4,707,000 A * | 11/1987 | Torgardh | .............. | F16L 37/088 285/305 |
| 4,884,829 A * | 12/1989 | Funk | .............. | B60R 16/08 285/24 |
| 4,991,882 A * | 2/1991 | Gahwiler | .............. | F16L 37/084 285/319 |
| 5,419,594 A * | 5/1995 | Nelms | .............. | F16L 37/088 285/315 |
| 5,653,475 A * | 8/1997 | Scheyhing | .............. | B60H 1/00571 285/305 |
| 5,681,060 A * | 10/1997 | Berg | .............. | F16L 37/088 285/305 |
| 6,053,537 A * | 4/2000 | Guest | .............. | F16L 41/088 285/148.19 |
| 6,131,959 A * | 10/2000 | Profunser | .............. | F16L 33/20 285/256 |
| 6,142,537 A * | 11/2000 | Shimada | .............. | F16L 37/088 285/308 |
| 6,371,528 B1 * | 4/2002 | Kimura | .............. | F16L 37/088 285/305 |
| 6,554,322 B2 * | 4/2003 | Duong | .............. | F24H 9/2035 285/201 |
| 6,595,556 B1 * | 7/2003 | Zenko | .............. | F16L 37/008 285/140.1 |
| 6,983,958 B2 * | 1/2006 | Rautureau | .............. | F16L 37/088 285/305 |
| 7,387,318 B2 * | 6/2008 | Yoshida | .............. | F16L 37/088 285/321 |
| 7,393,019 B2 * | 7/2008 | Taga | .............. | F16L 33/227 285/321 |
| 7,699,356 B2 * | 4/2010 | Bucher | .............. | F16L 37/088 285/244 |
| 8,474,879 B2 * | 7/2013 | Herrera | .............. | F16L 37/088 285/321 |
| 2001/0002754 A1 * | 6/2001 | Dobler | .............. | F16L 37/088 285/321 |
| 2001/0009333 A1 | 7/2001 | Palvoelgyi | | |
| 2002/0182005 A1 * | 12/2002 | Milhas | .............. | F16L 33/227 403/403 |
| 2003/0132631 A1 * | 7/2003 | Nagata | .............. | F16L 37/0987 285/319 |
| 2003/0155763 A1 * | 8/2003 | Wolf | .............. | F16L 37/084 285/39 |
| 2004/0051313 A1 * | 3/2004 | Trouyet | .............. | F16L 37/088 285/305 |
| 2004/0201217 A1 * | 10/2004 | Mobley | .............. | F16L 11/127 285/417 |
| 2006/0022460 A1 * | 2/2006 | Callahan | .............. | F16L 37/088 285/305 |
| 2006/0131884 A1 * | 6/2006 | Inoue | .............. | F02M 37/0017 285/420 |
| 2007/0200339 A1 * | 8/2007 | Yagisawa | .............. | F16L 33/207 285/33 |
| 2008/0007052 A1 * | 1/2008 | Niki | .............. | F16L 37/088 285/305 |
| 2008/0012313 A1 * | 1/2008 | Reinholtz | .............. | F16L 37/0841 285/308 |
| 2008/0012326 A1 * | 1/2008 | Braathen | .............. | F16L 19/0231 285/354 |
| 2008/0157525 A1 * | 7/2008 | Yoshino | .............. | F16L 37/0841 285/376 |
| 2009/0045619 A1 * | 2/2009 | Tajika | .............. | F02M 37/0017 285/91 |
| 2009/0230674 A1 * | 9/2009 | Villaire | .............. | B60K 15/01 285/179 |
| 2010/0052314 A1 * | 3/2010 | Ishida | .............. | F16L 13/007 285/148.16 |
| 2010/0148497 A1 * | 6/2010 | Kaneda | .............. | F16L 37/0987 285/82 |
| 2010/0213702 A1 * | 8/2010 | Ishii | .............. | F16L 37/0982 285/33 |
| 2011/0241341 A1 | 10/2011 | Bauer et al. | | |
| 2012/0086197 A1 * | 4/2012 | Bauer | .............. | F16L 37/0987 285/81 |
| 2012/0104746 A1 * | 5/2012 | Fansler | .............. | F16L 37/088 285/239 |
| 2012/0248763 A1 * | 10/2012 | Nakamura | .............. | F02D 19/084 285/305 |
| 2013/0082459 A1 * | 4/2013 | Kaneko | .............. | F16L 37/088 285/93 |
| 2013/0181437 A1 * | 7/2013 | Semmel | .............. | F16L 37/0847 285/88 |
| 2013/0249209 A1 * | 9/2013 | Netzer | .............. | F16L 25/009 285/81 |
| 2014/0001748 A1 * | 1/2014 | Ignaczak | .............. | F16L 33/225 285/124.1 |
| 2014/0209074 A1 * | 7/2014 | Kahle | .............. | F16L 21/035 123/572 |
| 2014/0225366 A1 * | 8/2014 | Ignaczak | .............. | B60K 15/01 285/313 |
| 2014/0327240 A1 * | 11/2014 | Altenrath | .............. | F16L 37/088 285/321 |
| 2014/0339820 A1 * | 11/2014 | Suilmann | .............. | F16L 37/144 285/319 |
| 2015/0167880 A1 * | 6/2015 | An | .............. | F16L 37/088 285/400 |
| 2015/0211668 A1 * | 7/2015 | Campbell | .............. | F16L 25/009 285/330 |
| 2016/0146386 A1 * | 5/2016 | Blake | .............. | A61M 39/1011 285/45 |
| 2017/0114938 A1 * | 4/2017 | Tomlinson | .............. | F16L 37/12 |

FOREIGN PATENT DOCUMENTS

| | | |
|---|---|---|
| DE | 202007013347 U1 | 11/2007 |
| DE | 102008005717 A1 | 2/2009 |
| DE | 202011105646 U1 | 12/2012 |
| EP | 2372209 A2 | 10/2011 |
| FR | 2331743 A1 | 6/1977 |

* cited by examiner

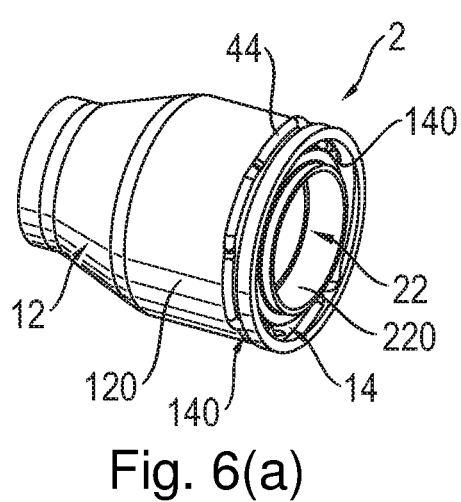
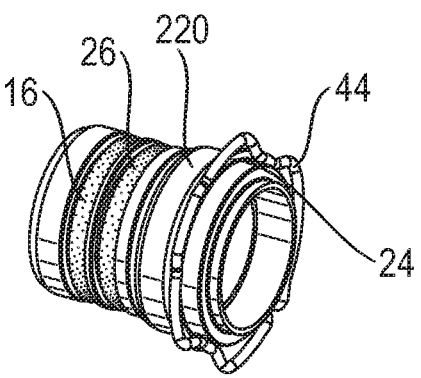
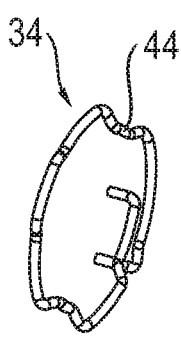
Fig. 6(a)　　Fig. 6(b)　　Fig. 6(c)
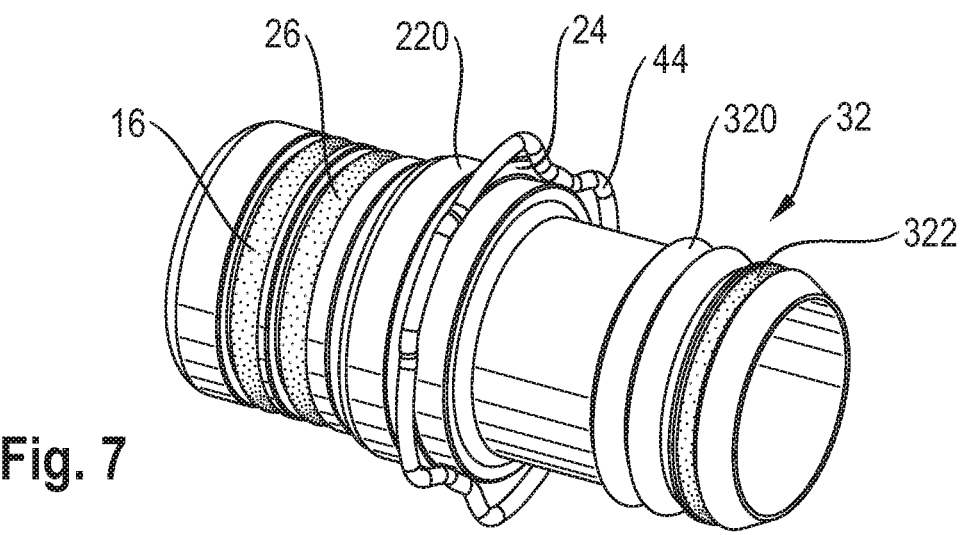
Fig. 7
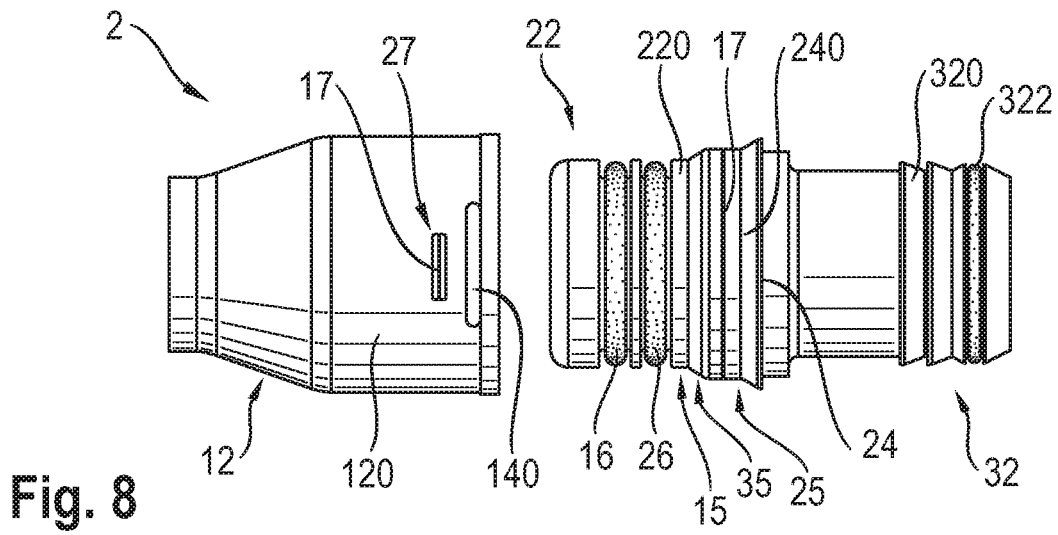
Fig. 8

VEHICLE COMPONENT AND MOTOR VEHICLE

CROSS-REFERENCE TO PRIOR APPLICATION

Priority is claimed to German Patent Application No. DE 10 2015 111 895.5, filed on Jul. 22, 2015, the entire disclosure of which is hereby incorporated by reference herein.

FIELD

The present invention relates to a vehicle component for a motor vehicle, having at least one coupling device with two couplable coupling elements for the fuel-tight connection of two lines, and to a motor vehicle having a vehicle component of said type.

BACKGROUND

Various vehicle components have become known in the prior art which permit a couplable connection of fuel lines. For example, DE 101 00 128 A1 presents a screw connection for the connection of two pipes, for example between a fuel tank and a filler neck. Here, a sleeve nut is provided which bears against an elastically slightly flexible ring-shaped bead of one pipe and which is screwed together with a threaded part of the other pipe. A sealing ring also bears against the ring-shaped bead, which sealing ring is pressed against the end of the other pipe by way of the screw connection.

DE 10 2008 005 717 A1 has disclosed a fuel tank having a filling pipe and having a neck which are fitted one inside the other and are connected to one another by way of flexible plastics detent hooks. Said connection is intended to exhibit a high pulling-off force owing to the detent hooks which are dimensionally stable in an axial direction.

DE 20 2011 105 646 U1 presents a connection between a refueling neck and a flexible pipe, which connection is secured by way of a sleeve which is rotatable in bayonet-like fashion. For the fuel-tight connection, the sleeve must press a sealing ring against a face-side widened portion. Since the sealing action is dependent on the pressing force of the sleeve, transverse forces could have a problematic effect. Another embodiment, described in DE 20 2011 105 646 U1, presents a slotted pipe, such that said pipe can expand when fitted onto another pipe. After being fitted on, the connection is secured by way of cable ties or hose clamps. Such a slotted pipe could constitute a problem in the presence of acting transverse forces.

SUMMARY

In an embodiment, the present invention provides a vehicle component for a motor vehicle. At least one coupling device including two couplable coupling elements is configured to provide, in a coupled state, a fuel-tight connection of two fuel-conducting lines. One of the coupling elements is in a form of a metallic female element which is fixedly connectable to one of the two lines, and an other one of the coupling elements is in a form of a metallic male element which is fixedly connectable to an other one of the two lines. The male element, for coupling purposes, is insertable into the female element, wherein, in the coupled state, an axially extending overlap section with at least one radial seal device is formed between the female element and the male element. At least one securing device is configured to secure the coupling elements in the coupled state against inadvertent release from one another.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIGS. 6(a), (b), and (c) shows vehicle components in a perspective view;

FIG. 7 shows a vehicle component in a perspective detail view; and

FIG. 8 shows a refinement of a vehicle component in a side view.

DETAILED DESCRIPTION

Figure 1:
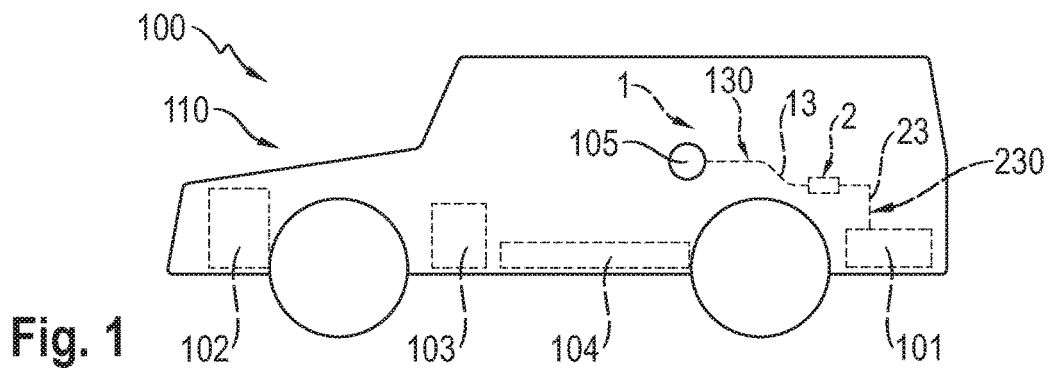
FIG. 1 shows, in highly schematic form, a motor vehicle having a vehicle component according to an embodiment of the invention.

The inventors have recognized one problem of prior connections is that, if transverse forces arise, it would be possible for fuel to escape. In contrast to the prior art, an embodiment of the present invention provides a vehicle component and a motor vehicle which permit a reliable connection of fuel lines, in particular even in the presence of acting transverse forces.

The vehicle component according to an embodiment of the invention is provided for a motor vehicle and comprises at least one coupling device with two couplable coupling elements. The coupling elements are suitable and designed for the fuel-tight connection of two fuel-conducting lines. The coupling device comprises at least one securing device for securing the connected coupling elements against inadvertent release from one another. Here, one of the two coupling elements is in the form of a metallic female element. The female element is suitable and designed for being fixedly connected to one of the two lines. The other coupling element is in the form of a metallic male element. The male element is suitable and designed for being fixedly connected to another of the two lines. The male element can, for the purposes of coupling the two lines, be inserted into the female element. In the coupled state of the two lines, an axially extending overlap section is formed between the female element and the male element. The overlap section comprises at least one radial seal device.

The vehicle component according to embodiments of the invention has numerous advantages. A major advantage is that the coupling elements are manufactured from a metallic material. This gives rise to a particularly reliable and stable connection. The lines can be connected such that, under the action of transverse forces, and for example in the event of a pole crash, an escape of fuel can be counteracted in a highly reliable manner.

A further advantage is that an axial overlap section is provided between the coupled-together coupling elements, in which overlap section there is arranged at least one radial seal device. In this way, the connection is reliably sealed off as soon as the male element is fitted into the female element. The sealing action is thus in particular independent of the action of a securing device for preventing inadvertent detachment. An advantage of an overlap region of said type with a radial seal is also that the sealing action is independent of a pressing force acting on the two coupling elements. This gives rise to a major advantage in relation to, for example, flange connections, in the case of which the sealing action is generally dependent on the force acting on the flange surface.

The coupling elements are particularly preferably manufactured from a steel alloy. This permits particularly inexpensive production, and at the same time offers high stability. The coupling elements may also be manufactured from some other suitable and in particular fuel-resistant metal alloy. For example, the coupling elements may be composed of an aluminum alloy or of a brass alloy. In particular, the male element and the female element are manufactured from the same metallic material. The male element and the female element may also be composed of two different metallic materials. The coupling elements are preferably manufactured as turned parts and/or milled parts. The coupling elements may also be provided as cast parts and/or forged parts. It may be provided that the vehicle component also comprises the lines that are connected to the coupling elements.

In a particularly preferred embodiment, one of the two lines is in the form of a filling pipe for a fuel tank of a motor vehicle. The other of the two lines is preferably in the form of a tubular refueling neck of the fuel tank. Here, the refueling neck is in particular fastened to the fuel tank. The filling pipe is preferably fastened to the body of the motor vehicle. The filling pipe may be connected to, or be formed as, a filling opening for a refueling nozzle of a refueling pump. In particular, the filling pipe and/or the refueling neck have a spatially curved profile. A spatially angular profile is also possible. It is possible for the vehicle component to also comprise the filling pipe and/or the refueling neck.

An embodiment of the lines as a filling pipe and refueling neck offers a particularly advantageous use of the metallic coupling elements. The high resistance to transverse forces in the event of a side-on collision is particularly advantageous here, because such lines generally run along one side of the vehicle. An embodiment of said type may also be used particularly advantageously in a so-called low emission vehicle (LEV), because the fuel system of such vehicles is subject to particular requirements and is for example often charged with positive pressure. Because of this, a reliable and stable connection of the lines is particularly crucial here.

The overlap section preferably has a length which corresponds to at least half of the internal diameter of the line which is connected to the female element. The overlap section may also have a length which corresponds to at least half of the internal diameter of the line connected to the male element. An overlap section of such a length offers a particularly reliable connection of the fuel lines. Owing to such an overlap section of correspondingly elongate form in an axial direction, the fuel leak-tightness can be maintained even in the event of the coupling elements being correspondingly pulled apart by acting transverse forces.

The overlap section particularly preferably has a length of at least 75% and preferably of at least 80% and particularly preferably of at least 90% of the internal diameter of the line connected to the female element and/or to the male element. It is also possible for the overlap section to have a length which corresponds to the internal diameter of the respective lines. It is also possible, and preferable, for the overlap section to have a length which is greater, by a particular factor, than the internal diameter of the line connected to the female element or to the male element. The factor may amount to for example 1.2 or preferably 1.5 or even 2.0 or 2.5 or higher. It is also possible, in certain embodiments, for the overlap section to be shorter.

It is possible for the overlap section to have at least two radially running subsections. The subsections preferably have different diameters. The subsections may also have identical diameters. The subsections are particularly preferably connected by way of at least one subsection running in ramp-shaped fashion. The ramp-shaped subsection may have a straight or a curved ramp profile. It is also possible for multiple subsections of different diameters to be provided, which are connected to one another by way of multiple subsections running in ramp-shaped fashion. An embodiment of the overlap section with different subsections makes it possible to realize a correspondingly elongate overlap section, and at the same time particularly good insertability and thus uncomplicated coupling-together of the coupling elements. In particular, the different diameters of the subsections are realized by virtue of the coupling elements being of thin-walled form at their ends pointing toward one another. The flow cross section provided for conducting the fuel preferably remains unaffected by a change in diameter of the subsections.

It is possible, and preferable, for at least one of the two lines to be composed of a metallic material. The line is for example manufactured from a steel alloy. Other metal alloys are also possible. In particular, the filling pipe for the fuel tank is manufactured from a metallic material. It is however also possible for the tubular refueling neck of the fuel tank to be composed of a metallic material.

In an advantageous embodiment, both lines may be composed of a metallic material. In particular, the refueling neck and the filling pipe are composed of a metallic material, and for example of a steel alloy. By way of such an embodiment, the stability and resistance to transverse forces can be even further improved.

It is particularly preferable for the line, which is composed of a metallic material, to be connected cohesively to the associated coupling element. In particular, the metallic line and the associated coupling element are welded to one another. An adhesively bonded or brazed connection is also possible. It is also possible for other suitable and in particular non-detachable joining connections to be provided. The coupling element and at least one part of the associated metallic line may also be formed in one piece. For example, the female element is cohesively connected to a metallic line. It is also possible for the male element to be connected to the metallic line. Such a connection can be produced inexpensively, and furthermore offers permanent durability.

In an advantageous refinement, at least one of the two coupling elements comprises, at one end, at least one fitting-on region. The fitting-on region comprises at least one ribbed surface for the fitting-on of a line. A fitting-on region permits a very uncomplicated and at the same time reliable connection of a plastics line to the respective coupling element. The line to be fitted on is composed in particular of a plastics material. The fitting-on region may also be suitable and designed for a line composed of a rubber material or some other non-metallic material to be fitted on.

The fitting-on region is preferably connected cohesively to the coupling element. The fitting-on region is for example welded on. An adhesive or brazed connection is also possible. The coupling element and the fitting-on region may also be formed in one piece. It is also possible for the fitting-on region to be provided as a separate component. For example, the fitting-on region and the coupling element may be screwed together for the purposes of assembly. It is possible for at least one hose clamp and/or at least one cable tie to be provided for securing the plastics line on the fitting-on region. The fitting-on region preferably comprises at least one seal device and, for example, at least one O-ring. The fitting-on region is composed in particular of a metal alloy, preferably of the same material as the coupling element connected to the fitting-on region. The fitting-on region is in particular connected to the male element.

The seal device is preferably arranged partially in at least one radially running groove. The groove is provided in particular on the outer side of the male element. Such an embodiment permits reliable sealing and, at the same time, fast and inexpensive installation of the seal device. It is also possible for the groove to be provided on the inner side of the female element. In this case, it is the case in particular that at least one part of the seal device extends outside the groove. It is possible, and preferable, for the groove to be provided as a recess in the wall of the coupling element, such that the flow cross section is not encroached upon by the walls surrounding the groove.

The seal device comprises, in particular, at least one O-ring. The seal device particularly preferably comprises at least two O-rings. The use of at least two O-rings improves the resistance of the connection to acting transverse forces. The O-rings are in particular received in in each case one radially running groove. It is also possible for three or four or more O-rings to be provided, which are arranged in corresponding grooves. Other types of seal elements or seal rings may also be provided.

It is preferable for the securing device to comprise at least one securing element and at least one securing section and at least one projection. Here, the securing section and the projection are arranged in particular on different coupling elements. For example, the securing section is arranged on the female element and the projection is arranged on the male element. The securing section is in particular suitable and designed for receiving the projection in a connected state of the coupling elements. The securing element is in particular suitable and designed for blocking, in positively locking fashion, an emergence of the projection from the securing section. Also possible is a non-positively locking blocking action, for example by way of a preloaded spring. In particular, the projection is inserted into the securing section during a coupling process of the coupling elements. A securing device of said type permits uncomplicated coupling, and at the same time a highly durable connection. The securing section and the projection are preferably formed in radially encircling fashion on the respective coupling element. It is also possible for mutually spaced-apart securing sections and/or projections to be provided along the circumference of the respective coupling element. It is also possible for only one securing section and/or projection to be provided. The securing section may for example be formed as a cutout or as a bell-shaped region. The projection comprises, in particular, at least one undercut, and is for example in the form of a lug or the like.

The securing element is preferably in the form of a ring-shaped spring clip. A spring clip of said type can be produced inexpensively and installed in uncomplicated fashion. Furthermore, a spring clip of said type allows the coupled lines to be secured in a particularly durable manner. The spring clip may for example be in the form of a ring with free ends. The ring may also be closed. In particular, in each case one installation aid is arranged on at least one end, preferably on both ends of the ring. The installation aid may for example make it easier for the spring clip to be gripped by hand or enable the spring clip to be received in a corresponding installation tool. An installation aid of said type makes it easier for the spring clip to be placed around the coupling element during the installation process, and makes it easier for the spring clip to be opened during a subsequent decoupling process.

In one advantageous refinement, the spring clip engages at least partially around the coupling element equipped with the securing section. The coupling element equipped with the securing section has, in a wall, at least one securing cutout. The spring clip preferably extends through the securing cutout into the securing section. The spring extending into the securing section engages, in particular, behind at least one section of the projection situated in the securing section. Such an embodiment makes it possible for the coupling of two lines to be secured in a particularly uncomplicated and stable manner. For example, the spring clip only has to be placed around one coupling element, and subsequently automatically presses into the respective securing section. Here, it may be provided that those regions of the spring clip which extend into the securing section are correspondingly pre-bent. For example, said regions can be bent inwardly into the ring-shaped profile of the spring clip. It is possible for two or three or four or more securing cutouts to be provided in the coupling element.

In an advantageous embodiment, the projection is beveled on a front side. Here, the front side is in particular the side with which the projection is inserted first into the corresponding coupling element, and in particular into the female element. The beveled projection is in particular suitable and designed for pushing the spring clip, which is situated in the securing section, out of the securing section during a coupling-together process of the coupling elements. This permits a coupling-together process without the spring clip additionally having to be pushed apart. The coupling elements can be easily fitted one inside the other, wherein the spring clip, owing to its inherent spring stress, automatically closes behind the projection and engages into the securing section again such that an emergence of the projection is reliably blocked. It is also preferable for the rear side of the projection to be designed such that the spring clip is held in the securing section in the event of the coupling elements being pulled apart. For example, an undercut is provided.

In all embodiments, it is preferable for one of the two coupling elements to comprise at least one visual marking element. In particular, the other of the two coupling elements comprises at least one viewing window. The marking element and the viewing window are preferably positioned relative to one another such that, in a connected state of the coupling elements, the marking element is visible within the viewing window. In particular, the marking element is visible through the viewing window only in a connected state of the coupling elements. In this way, the correct assembly of the coupling elements can be reliably monitored. The viewing window is in this case preferably provided on that coupling element which also bears the securing section. For example, the marking element is arranged on the male element and the viewing window is arranged on the female element. The marking element may for example be in the form of an encircling groove. A colored ring or the like, for example, is inserted into the groove. It is also possible for the groove to have a color marking, and for example to be painted.

It is also possible for a haptic or mechanical marking element to be provided. For example, correct coupling can be made identifiable by virtue of the marking element protruding in perceptible fashion within the viewing window. A marking element with an acoustic action is also possible. It is also possible for a marking element to be provided without a viewing window. It is also possible for the viewing window or some other region of the coupling element to likewise have an in particular colored marking in order to permit a correct assignment of associated coupling elements.

The motor vehicle according to embodiments of the invention comprises at least one vehicle component according to embodiments of the invention. In particular, the motor vehicle comprises a vehicle component, in the case of which one line is in the form of a filling pipe for a fuel tank and the other of the two lines is in the form of a tubular refueling neck of the fuel tank. A vehicle of said type offers a particularly stable connection of the lines, which connection can withstand acting transverse forces.

FIG. 1 shows a motor vehicle 100 in the form of a hybrid vehicle 110, which motor vehicle is equipped with a vehicle component 1 according to an embodiment of the invention. Here, the vehicle component 1 comprises a coupling device 2, by means of which two fuel-conducting lines 13, 23 are connected to one another in fuel-tight fashion. The coupling device 2 will be described in more detail in the following figures. Here, one line 13 is in the form of a filling pipe 130 of a fuel tank 101 of the hybrid vehicle 110. The other line 23 is in the form of a refueling neck 230 which is connected to the fuel tank 101. The filling pipe 130 is equipped, at one end, with a correspondingly closable filling opening 105, via which the fuel tank 101 can be filled.

The hybrid vehicle 110 furthermore has an internal combustion engine 102 and an electric drive 103, which are supplied with energy from a traction battery 104. In the case of hybrid vehicles, particularly high demands are placed on the fuel system because, in electric drive phases, the fuel vapors present in the fuel tank 101 cannot be utilized in the internal combustion engine 102. The fuel tanks 101 of such hybrid vehicles 110 are therefore commonly charged with a certain pressure. The vehicle component 1 according to an embodiment of the invention can be used particularly advantageously here because the coupling device 2 preferably satisfies such demands on the fuel system. Furthermore, the coupling device 2 proposed here also offers particularly high resistance to acting transverse forces, such that a sealed connection of the fuel-conducting lines 13, 23 can be ensured in a particularly reliable manner.

Figure 2:
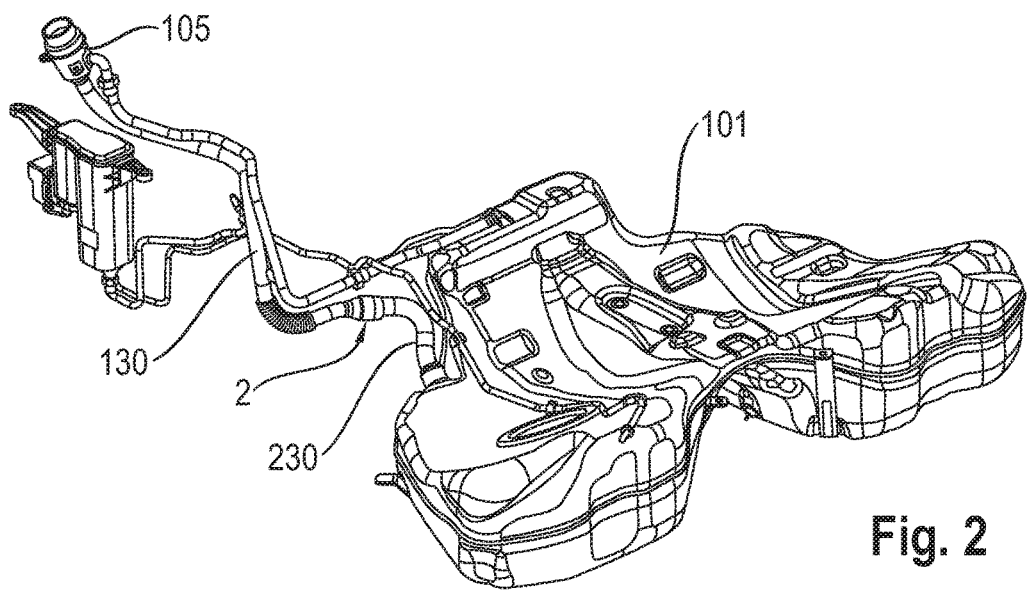
FIG. 2 shows a fuel tank with lines in a perspective view.

FIG. 2 shows a perspective view of a fuel tank 101 with an attached refueling neck 230. The refueling neck 230 is connected to the filling pipe 130 by way of the coupling device 2. The filling opening 105 is provided at one end of the filling pipe 130. The filling pipe 130 is preferably fastened to a body. The refueling neck 230 is preferably connected and fastened to the fuel tank 101. Furthermore, the fuel tank 101 comprises further lines and, for example, a capturing device for fuel vapors. Here, the filling pipe 130 and the refueling neck 230 each have multiple spatial bends. Owing to the complex spatial structure, it is generally the case that, after the assembly of such lines 13, 23, a change of the positioning thereof is no longer possible. The coupling device 2 proposed here offers the advantage that the assembled lines 13, 23 can be coupled to one another in fuel-tight fashion without the lines 13, 23 having to be rotated or moved in the process.

Figure 3:
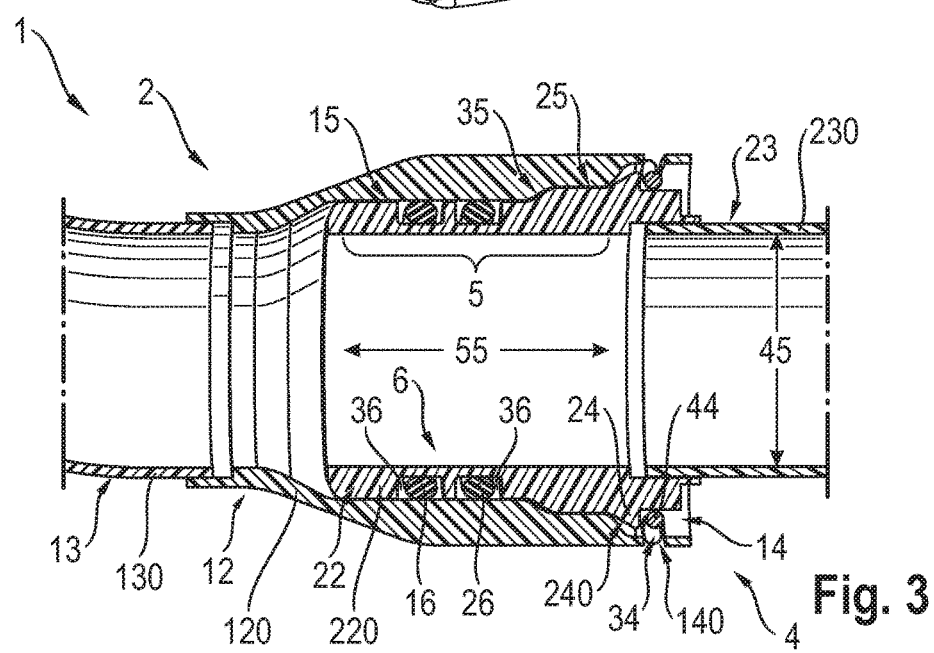
FIG. 3 shows a vehicle component in a sectional side view.

FIG. 3 shows a sectional side view of the coupling device 2 with two coupled coupling elements 12, 22. One coupling element 12 is in this case in the form of a female element 120 and the other coupling element 22 is in the form of a male element 220. The female element 120 is manufactured from a steel alloy and is connected cohesively, for example by welding, to a metallic line 13. The line 13 is in particular in the form of the filling pipe 130. Here, the male element 220 is likewise manufactured from a steel alloy and connected cohesively to another line 23, which in this case is in the form of a refueling neck 230.

In the coupled state shown here, the male element 220 has been inserted into the female element 120. Here, an elongate overlap section 5 running in an axial direction is formed between the male element 220 and the female element 120. The length 55 of the overlap section 5 is in this case greater than the internal diameter 45 of the line 23 connected to the male piece 220. Furthermore, the length 55 of the overlap section 5 is greater than the internal diameter of the line 13 connected to the female element 120, and is greater than the internal diameter in the flow region of the male element 220. Such an overlap section 5, owing to its axial extent, offers a particularly reliable connection which is particularly resistant to acting transverse forces.

The overlap section 5 in this case comprises a first subsection 15 and a second subsection 25, which are connected to one another by way of a third subsection 35 running in ramp-shaped fashion. Here, the first subsection 15, which is arranged on the front end of the male element 220, has a smaller diameter than the second subsection 25, which is situated further behind. By way of such an embodiment, a correspondingly long overlap section 5 is made possible, without the need for the coupling device 2 as a whole to be lengthened. Furthermore, the different diameters and the ramp-shaped subsection 35 permit a particularly fast and uncomplicated insertion during the coupling process.

Here, a seal device 6 is arranged in the first subsection 15 of the overlap section 5. The seal device 6 comprises in this case two O-rings 16, 26 arranged parallel and adjacent to one another. The O-rings 16, 26 are partially recessed in a respective groove 36 which is formed into the wall of the male element 220. It is also possible for three or more O-rings to be provided. An embodiment with only one O-ring is also possible. By way of a radially running seal device 6 of said type, it is possible to ensure a fuel-tight coupling without the need for a certain contact pressure to act on the two coupling elements 12, 22. The radial seal device 6 within the overlap section 5 thus has a particularly advantageous effect on the resistance of the connection to transverse forces.

To prevent an undesired decoupling as a result of the coupling elements 12, 22 being pulled apart, a securing device 4 is provided here. In this case, there is formed on the female element 120 a securing section 14 into which a projection 24 of the male element 220 can be inserted. When the female element 120 and the male element 220 have been coupled to one another correctly, the projection 24 is situated within the securing section 14. To prevent undesired coupling, the projection 24 is prevented from emerging from the securing section 14 by way of a securing element 34 which abuts in positively locking fashion.

Here, the securing element 34 is in the form of a spring clip 44 which is placed around the external wall of the female element 120. Here, the wall of the female element 120 has, in sections, securing cutouts 140 through which the spring clip 44 extends into the securing section 14 and comes to lie, as a positively locking obstruction, behind the projection 24. A securing device 4 of said type is firstly inexpensive to produce and install and furthermore offers a securing action which is highly resistant to acting forces and vibrations. Furthermore, a securing device 4 of said type is particularly well suited to metallic coupling elements 12, 22 which do not have flexible detent lugs.

Here, the projection 24 is beveled on its front side 240 such that, as the male element 220 is inserted into the female element 120, the spring clip 44 is automatically pushed out of the securing section 140. The rear side of the projection 24 is formed with a corresponding undercut such that, when coupling has been performed correctly, the spring clip 44, owing to its spring stress, automatically springs back into the securing section 14. The noise of the springing-back spring clip 44 that arises here may for example be provided as an acoustic verification of coupling having been performed correctly. Such a self-securing connection offers considerably faster and cheaper assembly in relation to screw connections, for example.

Figure 4:
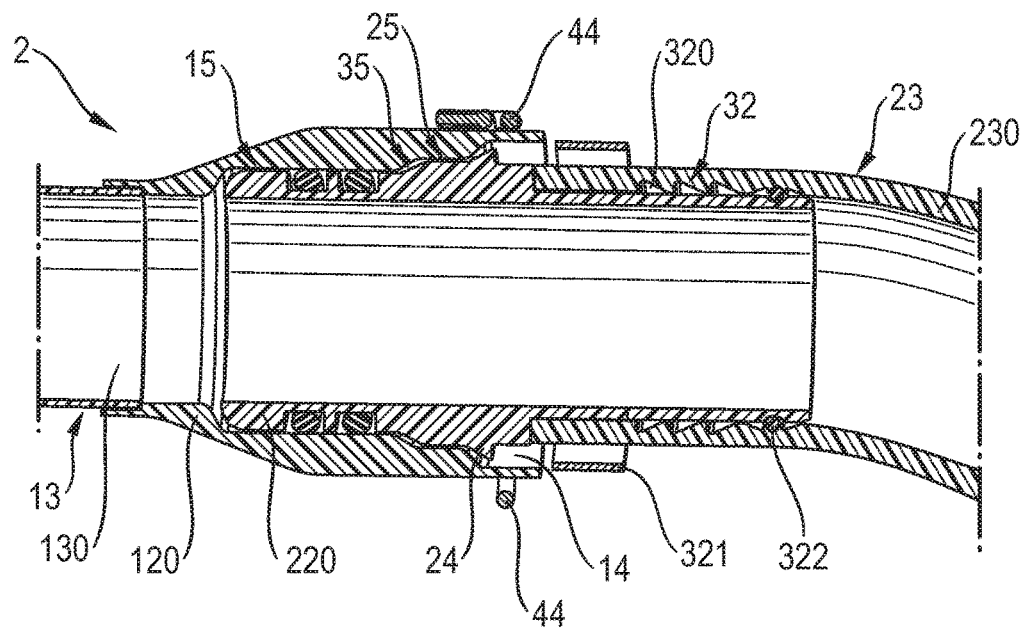
FIG. 4 shows another embodiment of a vehicle component in a sectional side view.

FIG. 4 shows a coupling device 2 in a sectional illustration, with a female element 120 which, in this case, is welded to a metallic line 13 in the form of a filling pipe 130. The coupling device 2 shown is sectioned in a different plane than the coupling device 2 shown previously in FIG. 3. The male element 220 is connected to a line 23 composed of a plastics material. As plastics material, use is made for example of a material such as HDPE or EVOH or some other suitable and correspondingly fuel-resistant plastic. The line 23 is for example in the form of a refueling neck 230. For the connection to the line 23 composed of a plastics material, the male element 220 has a fitting-on region 32 with a ribbed surface. Here, the ribs 320 are arranged adjacent to one another and run in each case radially around the fitting-on region 32. To additionally secure a line 23 that has been fitted on, a hose clamp 321 is provided here. For the line 23, use is preferably made of a plastics material which swells to a certain extent as a result of the contact with the fuel, such that the hose clamp 321 can become embedded. Furthermore, the fitting-on region 32 in this case comprises a radially running O-ring 322 for sealing purposes.

Here, the fitting-on region 32 is preferably connected cohesively to the male element 220. In particular, the fitting-on region 32 is coupled to that region of the male element 220 which is otherwise provided for the cohesive connection to a metal line. This has the advantage that no structural modifications to the male element 220 are required for the use of plastics lines or metallic lines. For example, the male element 220 and the fitting-on region 32 are welded to one another. It is also possible for male element 220 and fitting-on region 32 to be provided in unipartite form.

Figure 5:
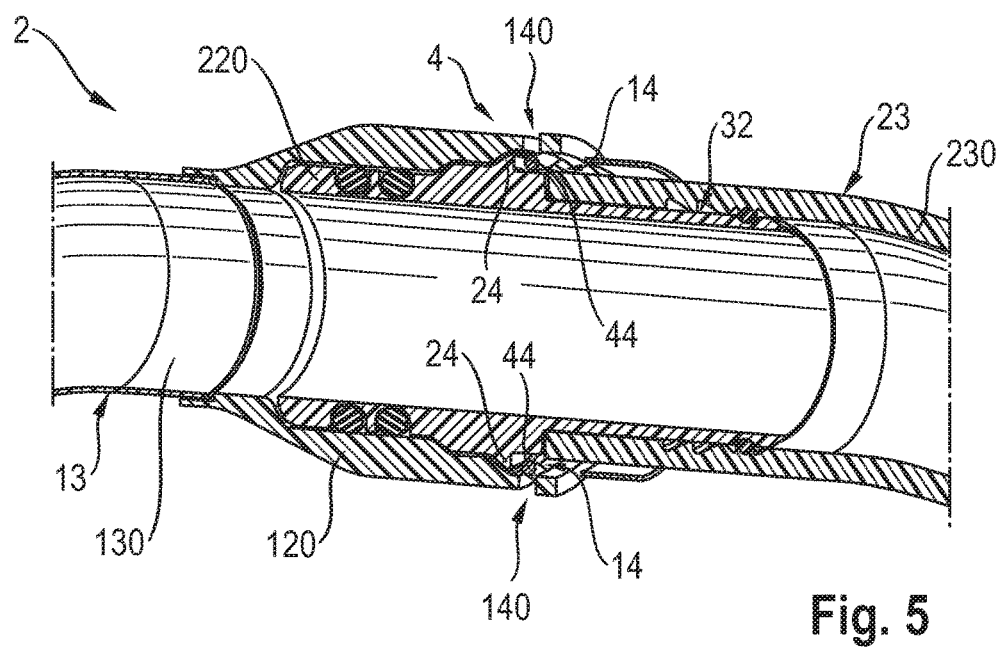
FIG. 5 shows the vehicle component of FIG. 4 in a sectional perspective illustration.

FIG. 5 shows the coupling device 2 from FIG. 4 in a perspective view in a different section plane. The arrangement of the securing cutouts 140 within the wall of the female element 120 can be seen particularly clearly here. It is also possible to clearly see the profile of the spring clip 44 within the securing section 14 after it enters through the securing cutouts 140. The spring clip 44 extends through the securing cutout 140 and comes to lie behind the projection 24, such that decoupling is prevented in positively locking fashion.

FIG. 6(a) shows a coupling device 2, with a female element 120 and a male element 220, in a perspective illustration. In FIG. 6(a), the female element 120 and male element 220 are coupled and have been secured by way of the spring clip 44. Here, the spring clip 44 runs into the female element 120 and passes through the securing cutouts 140 into the securing section 14, and, there, comes to lie behind the projection 24 of the male element 220. To that end of the male element 220 which is shown here there may be welded, for example, a fitting-on region 32 or a metallic pipeline.

In FIG. 6(b), for a better overview, the female element 120 has not been illustrated. In FIG. 6(c), the securing element 34 in the form of the spring clip 44 is illustrated separately in a perspective view. The spring clip 44 is bent into a ring shape. Here, those regions of the spring clip 414 which are provided for entering the securing cutout 140 are bent inward slightly. Furthermore, the spring clip 44 is, at the ends, formed with a corresponding bend as an installation aid. At the outwardly bent ends, the spring clip 44 may for example be received in installation pliers or else gripped by hand.

FIG. 7 shows the male element 220 shown in FIGS. 6(a) and (b) with an attached fitting-on region 32. Here, the fitting-on region comprises multiple ribs 320 and an O-ring 322.

FIG. 8 shows a coupling device 2 which is equipped with a visual identification device for the verification of coupling of the coupling elements 12, 22 having been performed correctly. Here, the female element 120 has a viewing window 27. Here, the viewing window 27 is in the form of a hole through the wall. The male element 220 comprises a marking element 17. In a correctly coupled state, the marking element 17 is situated visibly within the viewing window 27. In this way, at a glance for inspection purposes, the correct coupling can be verified very quickly without the assembly time being lengthened by cumbersome checks. The marking element 17 can particularly preferably be seen within the viewing window 27 when the spring clip 44 has engaged in positively locking fashion behind the projection 24 of the male element 220.

Here, the marking element 17 is in the form of an encircling groove within the overlap section 5. It is for example possible for a colored plastics ring to be placed into the groove. It is also possible for an O-ring or the like to be placed into the encircling groove. It is also possible for a slotted plastics ring to be inserted. The color of the marking element 17 particularly preferably differs from the coloring of the O-rings 16, 26, 322 used for the seal. It is also possible for the groove to be coated with a color, for example by being painted.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE DESIGNATIONS

1 Vehicle component
2 Coupling device
4 Securing device
5 Overlap section
6 Seal device
12 Coupling element
13 Line
14 Securing section
15 Subsection
16 O-ring
17 Marking element
22 Coupling element
23 Line
24 Projection
25 Subsection
26 O-ring
27 Viewing window
32 Fitting-on region
34 Securing element
35 Subsection
36 Groove
44 Spring clip
45 Internal diameter
55 Length
100 Motor vehicle
101 Fuel tank
102 Internal combustion engine
103 Drive
104 Traction battery
110 Hybrid vehicle
120 Female element
130 Filling pipe
140 Securing cutout
220 Male element
230 Refueling neck
240 Front side
320 Rib
321 Hose clamp
322 O-ring

What is claimed is:

1. A vehicle component for a motor vehicle, the vehicle component comprising:
a filling pipe for a fuel tank;
a tubular refueling neck of the fuel tank;
at least one coupling device including:
a metallic female connector, configured to be fixedly connected to a first one of the filling pipe or the tubular refueling neck, and
a metallic male connector, configured to be fixedly connected to a second one of the filling pipe or the tubular refueling neck, the metallic male connector having an exterior surface with a groove disposed therein, the groove defined by a base and opposing side walls;
at least one securing device configured to secure the female connector and the male connector against inadvertent release from one another in a coupled state; and
a radial seal device arranged at least partially in the groove,
wherein the male connector is configured to be inserted into the female connector for coupling purposes,
wherein, in the coupled state, an axially extending overlap section is formed between the female connector and the male connector, the groove being located in the axially extending overlap section,
wherein the metallic female connector and the metallic male connector are configured to provide, in the coupled state, a fuel-tight connection of the filling pipe and the tubular refueling neck,
wherein the at least one securing device comprises at least one securing element and at least one securing section, which is arranged on a first one of the male connector and the female connector, and at least one projection, which is arranged on a second one of the male connector and the female connector, wherein, in the coupled state, the projection is inserted into the securing section, and wherein the securing element blocks, in a positively locking fashion, an emergence of the projection from the securing section, and
wherein the securing element is a ring-shaped spring clip.

2. The vehicle component as claimed in claim 1, wherein the overlap section has at least two radially running subsections of different diameter, the subsections being connected by at least one subsection which runs in ramp-shaped fashion.

3. The vehicle component as claimed in claim 1, wherein at least one of the male connector or the female connector comprises, at one end, at least one fitting-on region with a ribbed surface for a fitting-on of a line composed of a plastics material.

4. The vehicle component as claimed in claim 1, wherein the seal device comprises at least two O-rings.

5. The vehicle component as claimed in claim 1, wherein the spring clip engages at least partially around the first one of the male connector and the female connector, and wherein the first one of the male connector and the female connector has, in a wall, at least one securing cutout through which the spring clip extends into the securing section and engages behind the projection situated in the securing section.

6. The vehicle component as claimed in claim 1, wherein the projection is beveled on a front side such that, upon the male connector and the female connector being moved into the coupled state, the spring clip situated in the securing section is automatically pushed out of the securing section by the projection.

7. The vehicle component according to claim 1, wherein the side walls of the groove connect the base of the groove with the exterior surface of the metallic male connector.

8. The vehicle component according to claim 7, wherein the exterior surface of the metallic male connector is a cylindrical surface having a first diameter and wherein the base of the groove is an annular surface having a second diameter, the second diameter being less than the first diameter.

9. The vehicle component according to claim 1, wherein the exterior surface of the metallic male connector further includes a plurality of additional grooves disposed therein, each of the plurality of additional grooves having a base and two side walls, the vehicle component further comprising a plurality of additional radial seal devices arranged at least partially in the plurality of additional grooves.

10. The vehicle component according to claim 1, wherein the ring-shaped clip defines multiple radially inward bends, the radially inward bends extending through respective cutouts defined through the female connector and into contact with the male connector.

11. The vehicle component according to claim 10, wherein the ring-shaped clip defines a closed geometry.

12. The vehicle component according to claim 11, wherein the multiple radially inward bends comprise a first radially inward bend and a second radially inward bend, the first radially inward bend extending through a first of the cutouts and the second radially inward bend extending through a second of the cutouts;

the ring-shaped clip further defining a first pair of radially outward bends and a second pair of radially outward bends, the first radially inward bend being disposed directly between the first pair of radially outward bends, the second radially inward bend being disposed directly between the second pair of radially outward bends.

13. The vehicle component according to claim 12, wherein the female connector defines a viewing window, the viewing window being displaced from the first and second cutouts along an axial dimension of the female connector;

the male connector defining a second groove in which a slotted plastic ring is seated, the slotted plastic ring being externally visible through the viewing window.

14. The vehicle component according to claim 12, wherein the projection comprises a beveled side defining an undercut, the ring-shaped spring clip being seated directly within the undercut;

the beveled side being radially displaced from the female connector to define a circumferential gap disposed directly between the projection and the female connector.

15. A motor vehicle, comprising at least one vehicle component, the at least one vehicle component comprising:
a filling pipe for a fuel tank;
a tubular refueling neck of the fuel tank;
at least one coupling device including:
a metallic female connector, configured to be fixedly connected to a first one of the filling pipe or the tubular refueling neck, and
a metallic male connector, configured to be fixedly connected to a second one of the filling pipe or the tubular refueling neck, the metallic male connector having an exterior surface with a groove disposed therein, the groove defined by a base and opposing side walls;
at least one securing device configured to secure the female connector and the male connector against inadvertent release from one another in a coupled state, the securing device comprising a ring-shaped spring clip; and
a radial seal device arranged at least partially in the groove,
wherein the male connector is configured to be inserted into the female connector for coupling purposes,
wherein, in the coupled state, an axially extending overlap section is formed between the female connector and the male connector, the groove being located in the axially extending overlap section, and
wherein the metallic female connector and the metallic male connector are configured to provide, in the coupled state, a fuel-tight connection of the filling pipe and the tubular refueling neck.

16. The motor vehicle according to claim 15, further comprising:
a vehicle body,
wherein the filling pipe is fastened to the vehicle body.

17. The vehicle component according to claim 15, wherein the ring-shaped clip defines multiple radially inward bends, the radially inward bends extending through respective cutouts defined through the female connector and into contact with the male connector.

18. The vehicle component according to claim 17, wherein the ring-shaped clip defines a closed geometry.

19. The vehicle component according to claim 17 wherein the multiple radially inward bends comprise a first radially inward bend and a second radially inward bend, the first radially inward bend extending through a first of the cutouts and the second radially inward bend extending through a second of the cutouts;

the ring-shaped clip further defining a first pair of radially outward bends and a second pair of radially outward bends, the first radially inward bend being disposed directly between the first pair of radially outward bends, the second radially inward bend being disposed directly between the second pair of radially outward bends.

20. The vehicle component according to claim 19, wherein the female connector defines a viewing window, the viewing window being displaced from the first and second cutouts along an axial dimension of the female connector;

the male connector defining a second groove in which a slotted plastic ring is seated, the slotted plastic ring being externally visible through the viewing window;

the projection comprising a beveled side defining an undercut, the ring-shaped spring clip being seated directly within the undercut; and the beveled side being radially displaced from the female connector to define a circumferential gap disposed directly between the projection and the female connector.

* * * * *